United States Patent [19]

Hyland et al.

[11] Patent Number: 5,937,078
[45] Date of Patent: Aug. 10, 1999

[54] TARGET DETECTION METHOD FROM PARTIAL IMAGE OF TARGET

[75] Inventors: John C. Hyland; Gerald J. Dobeck, both of Panama City, Fla.

[73] Assignee: The United States of America as represented by the Secretary of the Navy, Washington, D.C.

[21] Appl. No.: 08/641,043

[22] Filed: Apr. 10, 1996

[51] Int. Cl.[6] ........................................... G06K 9/00
[52] U.S. Cl. ............................. 382/103; 342/90; 348/169
[58] Field of Search .................................. 382/103, 107, 382/156, 209, 217, 218, 224, 228, 273, 279, 312, 106, 169, 172, 100; 367/100, 7, 11, 87, 131; 224/3.17; 89/1.13; 235/411–416; 342/90–97, 159–160; 434/23; 348/169, 175

[56] References Cited

U.S. PATENT DOCUMENTS

| 5,251,185 | 10/1993 | Baggenstoss | 367/100 |
| 5,275,354 | 1/1994 | Minor et al. | 244/3.17 |
| 5,493,539 | 2/1996 | Haley et al. | 382/109 |

OTHER PUBLICATIONS

Eapen, A., Neural Network for Underwater Target Detection, IEEE Conference on Neural Networks for Ocean Engineering, p. 81–98, Aug. 1991.

Tou, Pattern Recognition Principles, p. 113–118, 1974.

Gonzalez, Digital Image Processing, p. 583–6, 443–8, 1992.

*Primary Examiner*—Jon Chang
*Assistant Examiner*—Jayanti K. Patel
*Attorney, Agent, or Firm*—Harvey A. Gilbert; Donald G. Peck

[57] ABSTRACT

A method for detecting a target partially obscured in the image. Sensor data from an area of concern in converted to image data indexed to represent the area. Test signature data is provided representative of the image of a portion of the type of target of interest. The image data is normalized and filtered using the test signature data to increase the signal-to-noise ratio of portions of the normalized data that approximate the test signature data. The so-filtered data is digitized to a logic level "1" or "0" based upon threshold criteria. The resulting digitized data is convolved with a unity weighting function window to generate correspondingly indexed density data. The density data values whose first conditional probability is at least p times more likely than the second conditional probability are then converted to a logic level "1" while the density data values whose first conditional probability is less than p times more likely than the second conditional probability are converted to a logic level "0".

3 Claims, 3 Drawing Sheets

TARGET DETECTION METHOD FROM PARTIAL IMAGE OF TARGET

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to target detection, and more particularly to a method of detecting and optionally classifying a target in an image when only a partial target signature is present in the image.

BACKGROUND OF THE INVENTION

High-resolution side scan sonar systems, both real aperture and synthetic aperture, provide long range detection and classification of mines in the highly cluttered, shallow water, coastal environment (10 feet–80 feet water depths). However, interpreting sonar images can be quite difficult because much of the natural and man-made clutter is mine-like. This can cause sonar operator fatigue and result in many false calls and missed mines. These difficulties, as well as a recent trend towards unmanned minehunting systems, have highlighted the need for automated sonar image processing techniques to detect and classify mines.

Current image processing approaches for sonar images as well as other type of images focus on detecting an overall target signature. They employ a variety of techniques to reduce unwanted noise and to enhance the target, thereby increasing the signal-to-noise ratio (SNR) and the probability of detecting and classifying any target. In general, these approaches do increase the probability of detection and classification when all or most of the overall target signature is detectable in the image. However, because they are designed to detect the entire target signature, they fail to work well when only a portion of the actual target signature matches the desired target signature.

To understand this problem more fully, assume the goal is to detect a mine-like target that is cylindrical, e.g., six feet long and two feet in diameter. If the sonar system's pixel resolution is six inches by six inches, the ideal target signature for this type of target would be 12 pixels by 4 pixels. Hence, the overall target signature that for which the image would be scrutinized would be 12 pixels by 4 pixels ((6 feet)*(2 pixels/foot) by (2 feet)*(2 pixels/foot)). If only one-half of the mine-like target were visible, the actual target signature would never match the ideal overall target signature and the detection strategy would likely fail.

SUMMARY OF THE INVENTION

Accordingly, it is an object of the present invention to provide a method of detecting a target in an image.

Another object of the present invention is to provide a method of detecting a target in an image when only a portion of the target's signature is present in the image.

Still another object of the present invention is to provide a method of classifying a target in an image when only a portion of the target's signature is present in the image.

Other objects and advantages of the present invention will become more obvious hereinafter in the specification and drawings.

In accordance with the present invention, a method is presented for detecting a target in an image even though the target is partially obscured in the image. One or more sensors generate sensor data from an area of concern and image data is generated from the sensor data. The image data is indexed to represent an image of the area of concern. Test signature data is provided and is representative of a portion of the type of target for which the method is searching. The test signature data is indexed to represent an image of the portion of the type of target. The image data is first normalized and then filtered using the test signature data to increase the signal-to-noise ratio of portions of the normalized data that approximate the test signature data such that first filtered data is generated. The first filtered data is digitized such that pieces of the first filtered data that have values greater than or equal to a given threshold level are converted to a logic level "1" and pieces of the first filtered data that have values less than the threshold level are converted to a logic level "0". The resulting "first" digitized data is convolved with a unity weighting function window to generate density data. As a result, a density data value is assigned to each piece of the first digitized data. The unity weighting function window is indexed to approximate an image of the type of target for which the method is searching. For each density data value, a first and second conditional probability are provided. The first conditional probability indicates the probability of observing the density data value given that the type of target is present and the second conditional probability indicates the probability of observing the density data value given that the type of target is not present. A probability threshold value p is also provided where p is a real number greater than zero. The density data is digitized using the first conditional probability, the second conditional probability and the probability threshold value p to generate "second" digitized data. More specifically, the density data values whose first conditional probability is at least p times more likely than the second conditional probability are converted to a logic level "1" while the density data values whose first conditional probability is less than p times more likely than the second conditional probability are converted to a logic level "0". A display image of the area of concern is formed using the second digitized data. Portions of the display image represented by clusters of pixels having a logic level "1" have a high probability of representing a target that is like the type of target for which the method is searching.

DETAILED DESCRIPTION OF THE INVENTION

The approach of the present invention can be applied to a broad class of detection problems. Accordingly, the present invention will first be explained in a general fashion and then be explained for an embodiment designed to detect mine-like targets. However, the present invention can be used in other embodiments that can include, but are not limited to, detecting and classifying cancerous tumors in mammogram, x-ray, and MRI images; detecting and classifying aircraft in radar images; detecting and classifying mobile ground targets with satellite images; and detecting and classifying unusual weather phenomenon in Doppler radar and satellite images.

Figure 1:
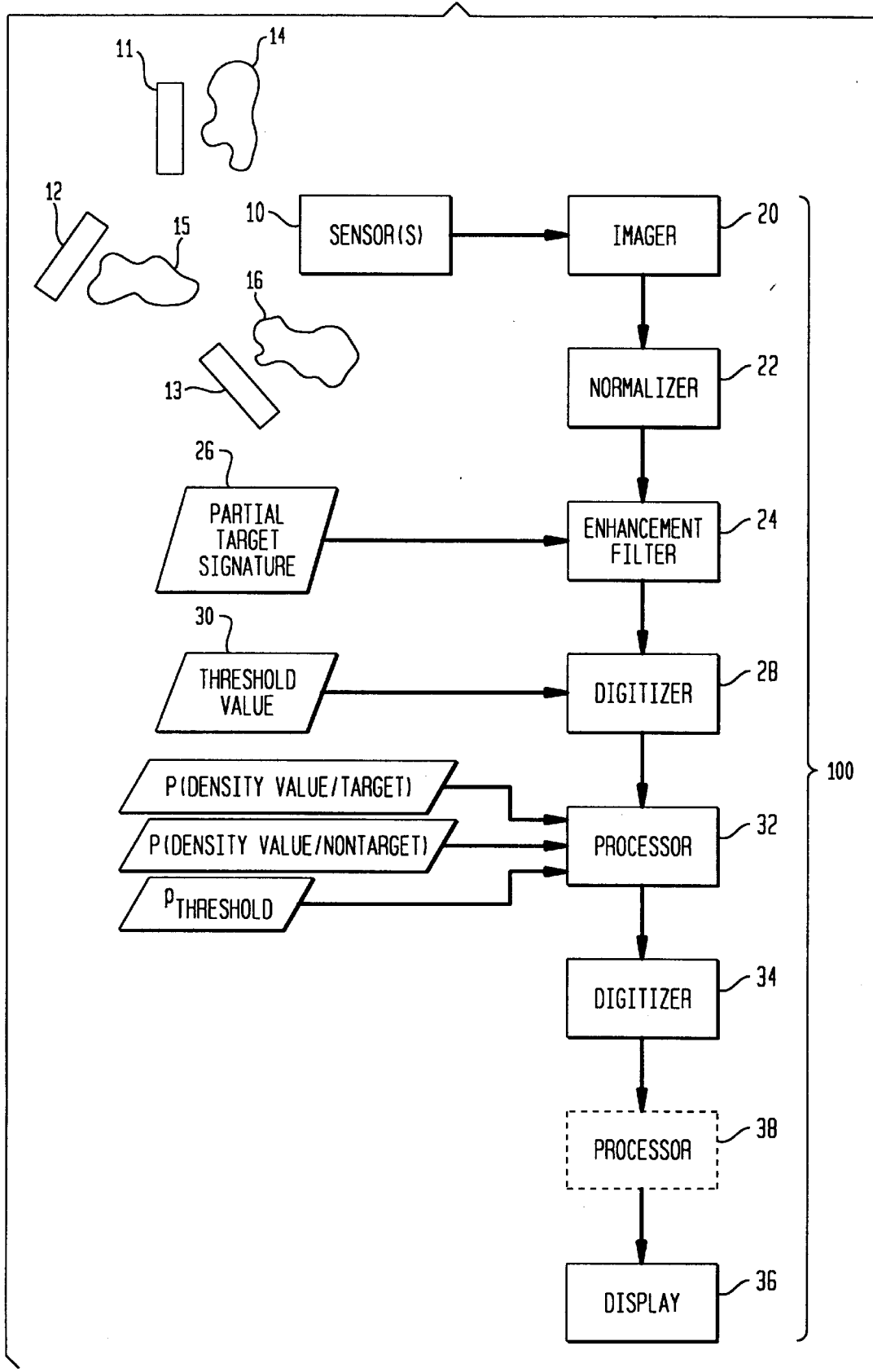
FIG. 1 is a block diagram of the system used to carry out the target detection method according to the present invention.

Referring now to the drawings, and more particularly to FIG. 1, a block diagram depicts a system for carrying out the target detection method of the present invention and is referenced generally by numeral 100. System 100 includes one or more sensor(s) 10 for collecting data, e.g., sonar, x-ray, radar, etc., about an area of concern within the range capabilities of sensor(s) 10. System 100 operates to detect and optionally classify targets 11, 12, 13 even though they are mostly obscured from the imaging field-of-view of sensor(s) 10 by means of obstacles 14, 15, 16, respectively. (Note that non-physical "obstructions" such as electronic or environmental noise can also prevent the entire image of the target from appearing.)

For simplicity of description, it will be assumed that each of targets 11, 12, 13 is the same type of target although the present invention can be extended for the simultaneous detection/classification of a variety of types of targets. When data collected by sensor(s) 10 is fed to an imager 20, which indexes the sensor data such that it can be viewed on a display (not shown), only small portions of targets 11, 12, 13 would appear on such a display. Each piece or pixel of data output from imager 20 thus has a value or intensity level associated therewith.

The image data from imager 20 is output to normalizer 22 which performs a conventional image processing technique referred to as image normalization. Essentially, normalizer 22 increases the overall signal-to-noise ratio and dynamic range of the image data by making the background noise level constant across the entire image, e.g., variations in pixel intensity. The normalized image data is then passed to an enhancement filter 24 for filtering with a partial target signature 26.

Partial target signature 26 is a set of indexed data that can be used to create an image of some small portion of the type of target for which system 100 is searching. In general, a plurality L of sensors 10 take L distinct measurements of an area of interest with the L measurements being indexed by M dimensions. Under ideal conditions, a sensor operator knows what the L measurements should be for an entire, unobscured target. This is the ideal target signature. However, non-ideal conditions cause the actual target signature to deviate from the ideal target signature. The partial target signature is formed by focusing the ideal target signature in on N dimensions of the M-dimensional indices where $N \leq M$. The focusing processing must be done on a case-by-case basis. For example, a sonar sensing system takes intensity level measurements and the intensity levels are indexed by two dimensions, namely, range and cross-range. The partial target signature for a sonar sensing system could thus be formed by focusing the ideal target signature in on the cross-range dimension.

Filter 24 can be implemented by any type of filter that increases the signal-to-noise ratio in those portions of the image that approximates the partial target signature. These types of filters typically enhance the portions of the image proportionally according to how closely the partial target signature matches portions of the image. Hence, portions of the image that match the partial target signature exactly are enhanced more than portions of the image that only closely resemble the partial target signature. Thus, portions of the image that achieve little or no matching with the partial target signature are not enhanced at all. In terms of the present invention, the overall effect of filter 24 is to suppress noise and clutter while simultaneously enhancing those portions of the normalized image data (e.g., portions of the image) that match or closely approximate partial target signature 26. Typically, filter 24 is adaptive so that filter coefficients are recomputed with each set of image data, i.e., each image, in order to suppress the noise and clutter that are unique to each image.

Because partial target signature 26 resembles only a small portion of the type of target being searched, there is a high probability that there will be many enhanced portions of data output from filter 24. However, environmental conditions in the area of concern and/or electronically induced noise can cause the enhancement of spurious regions of the data operated on by filter 24. Accordingly, the present invention examines the density of the enhanced regions of the filtered data at the next level of discrimination.

As a first step in the density examination process, the data output from filter 24 is passed to digitizer 28 which converts select pieces or pixels of the data received to a logic level "1" and converts the remainder of the pieces or pixels to a logic level "0". A threshold value 30 is supplied to digitizer 28 to determine the logic levels, however, the selection criteria can vary. For example, threshold value 30 could simply represent the K highest value (e.g., intensity level in terms of pixel value) pieces or pixels of data output from filter 24 for each image. The value K represents the minimum of all positive value pieces or pixels filtered data and a user-supplied cutoff level J. Another approach to the selection criteria is for threshold value 30 to represent a positive value that is compared with the value or intensity of each piece or pixel of filtered data. In either case, the pieces or pixels of data from filter 24 meeting the criteria are converted to logic level "1" while the data not meeting the criteria are converted to logic level "0".

The digitized image data output from digitizer 28 is then further discriminated by processor 32 and digitizer 34 to highlight those regions of the digitized image data that are most likely to be the type of target being searched. This is accomplished in the following manner. Each piece or pixel of data output from digitizer 28 is convolved (using processor 32) with a window of data defined by a unity weighting function. As is understood in the art, convolving is the process of cross-multiplying the window with each piece or pixel of data and then summing the cross-multiplied products to form correspondingly indexed pieces or pixels of density image data. In terms of an image coordinate system, the window is sized and shaped commensurate with an image representation of the type of target being searched. As a result, regions of the digitized image data in the vicinity of a mine-like target typically result in high density image data values. Next, the value of each piece of density image data is processed using a Bayesian (or other) detection rule to classify same as being either representative of a target or a non-target. To do this, the detection rule must be provided with three inputs: a first conditional probability P(density value|target), a second conditional probability P(density value|non-target) and a probability threshold $P_{threshold}$.

The conditional probabilities P(density value|target) and P(density value|non-target) are typically estimated by histogramming a training set of data. More specifically, the two conditional probabilities are calculated from the histograms for all possible values of density image data. The training process generates density image data for an entire set of training data. Then, by using the known positions of targets in the training set, density image histograms can be computed for both target regions of the training data image and non-target regions of the training data image. In other words, each piece of actual density image data has a conditional probability P(density value|target) that the piece of density image data has its calculated value given that it is from a target-like object, and a conditional probability P(density value|non-target) that the piece of density image data has its calculated value given that it is from a non-target-like object. The threshold $p_{threshold}$ is used to summarize the relationship between the two conditional probability terms in the Bayesian detection rule and one user-defined term as follows.

$$p_{threshold} = \frac{[(\text{detection factor})p_{non-target}]}{p_{target}} \quad (1)$$

where "detection factor" is a user-supplied, real number greater than 0.0 that represents how much the P(density value|target) must exceed P(density value|non-target) before the value of the particular piece or pixel of density image data will be deemed to come from a target;

$P_{target}$ is the probability that a piece or pixel of data is from a target; and $P_{non-target}$ is the probability that a piece or pixel of data is from a non-target.

Although both $P_{target}$ and $P_{non-target}$ are unknown, since the $p_{threshold}$ term includes them, the $p_{threshold}$ term can be varied across a wide range of possible values so that corresponding detection and false alarm performance can be documented. The user then chooses a $p_{threshold}$ value that yields acceptable performance.

Digitizer 34 processes the density image data using conditional probabilities P(density value|target) and P(density value|non-target) and threshold $p_{threshold}$. More specifically, for each piece of density image data output from processor 32, a detection rule is applied and is defined as follows:
The density value is target-like if $P_{threshold}$*P(density value|target)≧P(density value|non-target), otherwise the density value is considered non-target-like. Using Baye's theorem, this is equivalent to choosing the larger of $P_{threshold}$*P(target|density value) and P(non-target|density value) where P(target|density value) is the conditional probability that a pixel is mine-like given a density value and P(non-target|density value) is the conditional probability that a pixel is non-mine-like given a density value.)
Applying this detection rule, digitizer 34 converts each piece or pixel of the density image data to a logic level "1" when the rule is satisfied or to a logic level "0" when the rule is not satisfied.

The output from digitizer 34 could be passed directly to a display 36 where the processed image could be analyzed by an experienced operator. Another alternative is that the output from digitizer 34 could be processed by processor 38 (shown in phantom) before being passed on to display 36. Processor 38 could employ a grouping algorithm to cluster neighboring target-like pieces or pixels into a single group. In general, the algorithm would specify a distance within which logic level "1" pixels would be considered to be from the same object.

An illustrative example of the present invention will now be explained as it relates to the sonar detection of mine(s). The type of mine to be searched for is assumed to be cylindrical and of known dimensions. As with any application of the present invention, mine detection begins with an overall target signature specification. This should be performed on a case-by-case basis and is completely dependent on the performance capability of the sensor(s) to be used and the characteristics of the mine(s). The idealized model of the mine signature is then used in determining an appropriate partial target signature (PTS) that produces satisfactory system performance.

Figure 2:
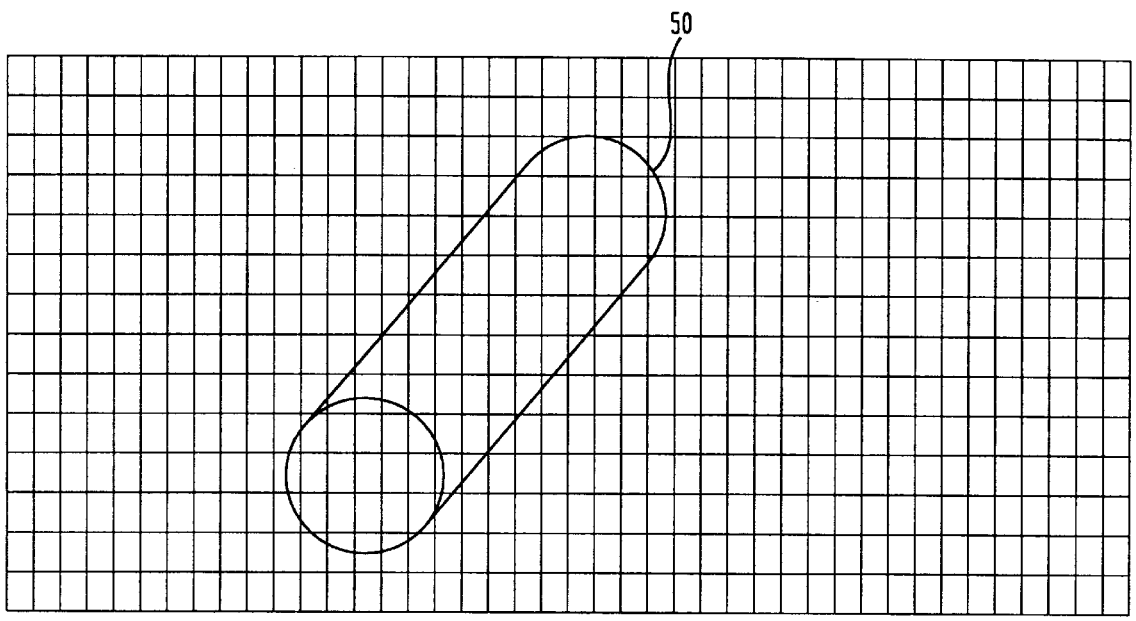
FIG. 2 is a perspective view of a cylindrical mine target overlaid on a grid representing pixels of an image.
Figure 3:
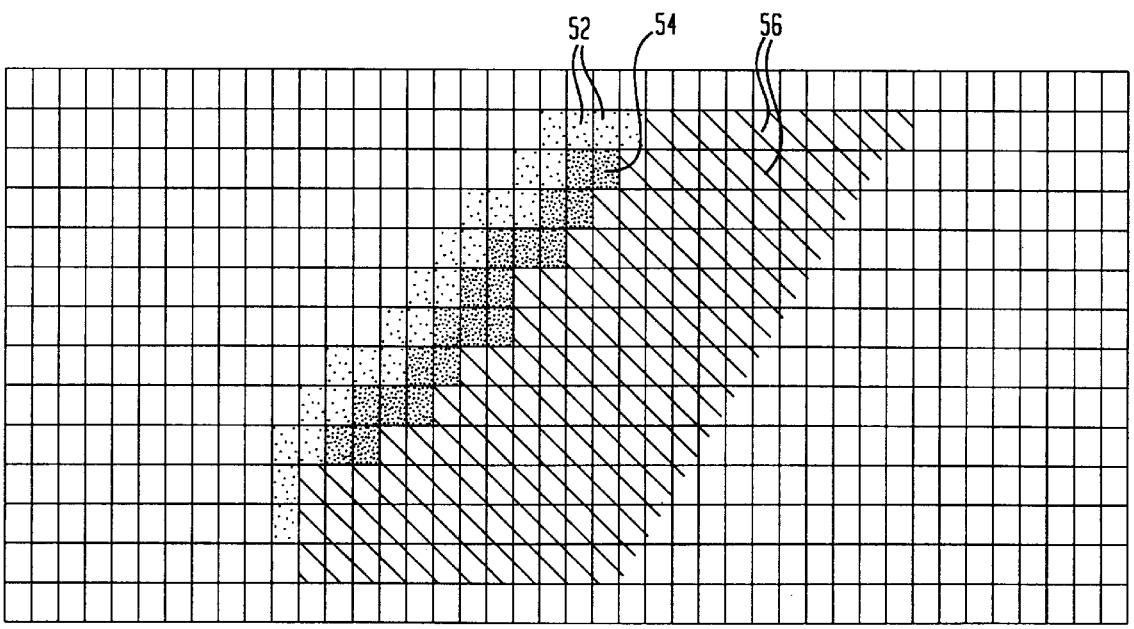
FIG. 3 is an image of the ideal sonar return from the mine shown in FIG. 2.

FIG. 2 shows a cylindrical target representing a mine 50 lying on the bottom of the sea at a 45° aspect overlaid on a grid whose abscissa represents range and ordinate represents cross-range. Each cell or pixel of the grid represents a piece of the image data required to form the image. FIG. 3 shows an image of the ideal sonar return from mine 50. The return contains a strong highlight represented by spotted pixels 52, a definite transition area or dead zone represented by shaded pixels 54, and a pronounced shadow represented by hatched pixels 56. Facets on mine 50 that reflect energy directly back towards the sonar cause the strong highlight return. The highlight's intensity is typically much greater than that of the bottom return. Sonar energy that hits the dead zone does not reflect directly back to the sonar. Hence, the dead zone return intensity is usually less than that of the bottom return. The front of the mine blocks the sonar pulse from reaching the area behind the mine. This creates a large shadow area which returns little energy at all. An ideal, overall target signature must account for all of these regions and the desired target's size.

As will be understood by one skilled in the art, the overall and partial target signatures can be developed in a variety of ways. In the illustrative example, development of these signatures used automatic target recognition for sonar imagery developed under contract to the U.S. Navy by Loral Federal Systems of Manassas, Va. A correlation matched filter with a reference signature was used to define the highlight, transition and shadow areas. The partial target signature (PTS) weights were chosen so that their sum was zero to make the PTS invariant to DC offset at enhancement filter 24. The PTS was selected to cover just a small part of a mine so that the filtering process provided by filter 24 was somewhat invariant to mine orientation. The PTS can be enhanced by adding a pre-target region that defines the area in front of the mine, region(s) located away from the mine, or both that should equal the average background level for a properly normalized image. By defining these additional regions, improved performance is achieved at enhancement filter 24 in terms of filtering out non-mine-like targets that happen to resemble mines.

Figure 4:
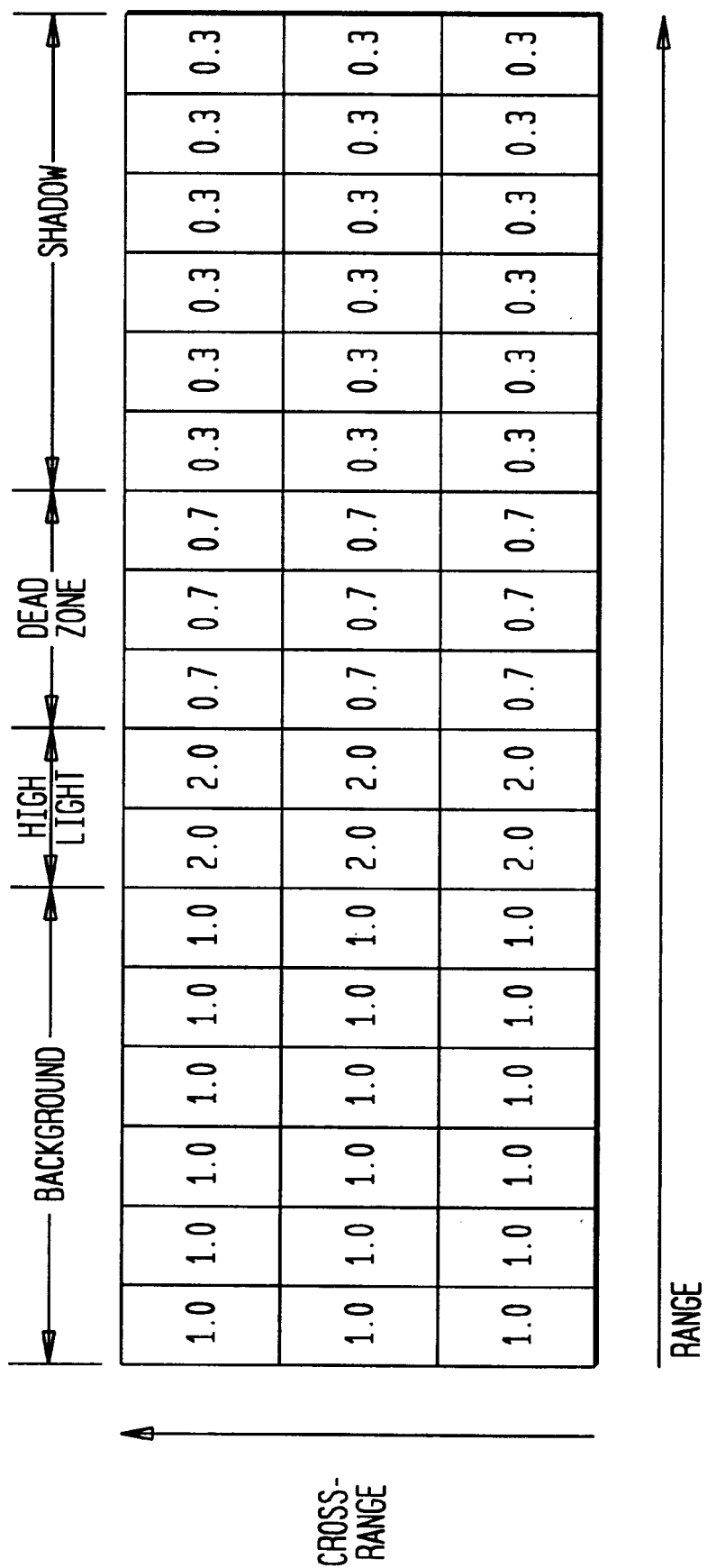
FIG. 4 depicts the partial target signature mask for a cylindrical mine in the illustrative embodiment of the present invention.

To determine the partial target (mine) signature in the illustrative example, sixty sonar images were used from a sonar image database to calculate the average return and the average return variance for all of the mines in the images. It was determined that a seventeen by three (range pixels by cross-range pixels) mask would provide a suitable PTS for mine 50. FIG. 4 shows the final PTS design for the illustrative example. The signature weights are 1.0 for the pre-target area, 2.0 for the target highlight area, 0.7 for the dead zone area and 0.3 for the shadow area. The total PTS size is 17 by 3 (range by cross-range) with the pre-target area being 6 by 3, the highlight area being 2 by 3, the dead zone area being 3 by 3, and the shadow area being 6 by 3. These region sizes are consistent with the mine images in the database. All signature weights within each of the four regions were constant.

As explained above, an area of concern is imaged and that image data is normalized at normalizer 22 prior to being passed to enhancement filter 24. The image normalization used in the illustrative example is a traditional sonar image processing technique that increases overall signal-to-noise ratio by decreasing the background noise, i.e., variations in pixel intensities as a function of range. These variations are normalized as follows. Each pixel at a fixed range r was divided by the average pixel intensity of all cross-range pixels at range r according to the relationship $$pn(r, c) = \frac{pr(r, c)}{pr_{avg}(r, c)} \quad (2)$$

for all cross-range values c at range r, where pn(r,c) is the normalized pixel intensity at range r and cross-range c;

pr(r,c) is the raw pixel intensity at range r and cross-range c; and $pr_{avg}$(r,c) is the average pixel intensity across the cross-range at a fixed range r.

For the illustrative example, enhancement filter 24 was realized by using image covariance information to estimate a two-dimensional finite impulse response (FIR) filter that minimizes the sonar image's energy subject to the constraint that the filter will give an output of unity for a desired target signature input. Filter 24 can be designed in accordance with the teachings of Aridgides et al. in "Adaptive Filter for Detection and Classification of Mines," SPIE Proceedings, Orlando, Fla., April 1995, which is hereby incorporated by reference. Briefly, filter 24 can be represented by the relationship $$w \circledX s = 1.0 \quad (3)$$

where $\circledX$ is the correlation operator;

s is the desired PTS; and w is the two-dimensional FIR filter coefficient matrix.

The overall effect is to suppress noise and clutter while simultaneously enhancing areas that match the PTS. For each image, the filter coefficients w are recomputed. Thus, filter 24 is adapted to suppress the noise and clutter that are unique to each image.

After the filtered image is output from filter 24, digitizer 28 operates to select the K largest, i.e., highest intensity, pixels from the filtered image where K is the minimum of J and the number of positive pixels in the filtered image. J is a user-supplied value chosen based on the number of mine-like objects expected in a given area, i.e., the more mines or mine-like objects expected, the higher the value of J. The K largest pixels are digitized to a logic level "1" while the remaining pixels are digitized to a logic level "0".

Since filter 24 is designed to annihilate the image under the constraint that a target signature will yield a filtered value of 1.0 and because the PTS or "s" has been sized to detect only a small portion of a mine, there should be many "high" values output from digitizer 28 in the vicinity of a mine-like object. Bottom clutter, reverberation and other noises, however, cause spurious "high" values to appear throughout the entire image in a somewhat random pattern. Regions containing mine-like objects will have a higher density of "high" values than other regions. The output from digitizer 28 is thus mapped into density based image data at processor 32 by convolving a small unity-valued rectangular window with the image data output from digitizer 28. A rectangularly shaped window was chosen because it approximates mine 50. Sizing of the window is commensurate with an image of mine 50.

The next part of the (mine) detection method is a recognition criteria that uses the Bayesian detection rule to classify the density image values as mine-like or non-mine-like. The detection rule implemented by digitizer 34 is the same as that described above. Thus, digitizer 34 creates a binary image such that pixels corresponding to the mine-like regions are set to a logic level "1", while non-mine-like regions are set to a logic level "0".

The digitized data from digitizer 34 can further be processed at processor 38 using a grouping algorithm to cluster neighboring mine-like pixels into a single group. All pixels within a prescribed distance to one another are considered to be from the same object. Such grouping algorithms are well known in the art and will not be described further herein.

The so-grouped image data can contain both the detected objects that satisfy the signature criteria for mine-likeness as well as objects that represent non-mines or false alarms. Thus, to improve upon overall performance, processor 38 could further embody a neural network to extract features from each object in the so-grouped image data. Such feature extraction neural networks are known in the art of mine detection. See, for example, Smith et al., "An Iterative Statistics Algorithm for the Detection of Acoustically Mine-like Objects," CSS TR-488-93, NSWC Coastal Systems Station, Dahlgren Division, Panama City, Fla., November 1993; Smedley et al., "Automated Detection and Classification of AQS-14 Sonar Targets with Neural Network Supplement," CSS TM-654-93, NSWC Coastal Systems Station, Dahlgren Division, Panama City, Fla., October 1994; Smedley et al., "Automated Detection and Classification of HPSS Sonar Targets with Neural Network Supplement," CSS TM-652-93, NSWC Coastal Systems Station, Dahlgren Division, Panama City, Fla., March 1994; and Smedley et al., "Improved Automated Detection and Classification of HPSS Sonar Targets with Neural Network Supplement," CSS TR-94/34, NSWC Coastal Systems Station, Dahlgren Division, Panama City, Fla., December 1994.

The advantages of the present invention are numerous. By being designed to specifically detect a portion of the desired target signature, the present invention can detect many of the partially obscured targets that existing techniques miss. The density detection methodology can be applied to any type of target imaging data. Thus, the present invention will have great utility in a wide variety of applications.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of detecting a type of target comprising the steps of:

providing at least one sensor that generates sensor data from an area of concern;

generating image data from said sensor data, said image data characterized by a first plurality of pixels that are indexed to represent an image of said area of concern, each of said first plurality of pixels defined by an intensity level;

providing a test signature representative of idealized sensor data for a portion of said type of target and areas immediately before and after said portion of said type of target, said test signature characterized by a second plurality of pixels that are indexed to represent an image of said portion of said type of target and said areas immediately before and after said portion of said type of target, each of said second plurality of pixels defined by a known intensity level;

normalizing said image data to generate normalized data;

filtering said normalized data using said test signature to increase the signal-to-noise ratio of portions of said normalized data that approximate said test signature wherein first filtered data is generated;

providing a threshold intensity level;

digitizing said first filtered data using said threshold intensity level to generate first digitized data, wherein pixels characterizing said first filtered data that have intensity levels greater than or equal to said threshold intensity level are converted to a logic level "1" and pixels characterizing said first filtered data that have intensity levels less than said threshold intensity level are converted to a logic level "0";

convolving said first digitized data with a data window to generate density data wherein a density data value is assigned to each pixel characterizing said first digitized data, said data window characterizing a third plurality of pixels that are indexed to represent an arrangement of pixels that is sized and shaped approximately equal to an image of said type of target, each of said third plurality of pixels defined by a unity weighting function;

providing a first conditional probability for each said density data value of said density data if said type of target is present, a second conditional probability for each said density data value of said density data if said type of target is not present, and a probability threshold value p where p is a real number greater than 0;

digitizing said density data using said first conditional probability, said second conditional probability and said probability threshold value to generate second digitized data, wherein said density data values whose said first conditional probability is at least p times more likely than said second conditional probability are converted to a logic level "1", and wherein said density data values whose said first conditional probability is less than p times more likely than said second conditional probability are converted to a logic level "0"; and forming a display image of said area of concern using said second digitized data wherein portions of said display image represented by clusters of pixels having a logic level "1" have a high probability of representing a target that is like said type of target.

2. A method of detecting a type of target comprising the steps of:

providing at least one sensor that generates sensor data from an area of concern;

generating pieces of image data from said sensor data, said image data indexed to represent an image of said area of concern;

providing test signature data representative of idealized sensor data for a portion of said type of target and areas immediately before and after said portion of said type of target, said test signature data indexed to represent an image of said portion of said type of target and said areas immediately before and after said portion of said type of target;

normalizing said image data to generate normalized data;

filtering said normalized data using said test signature data to increase the signal-to-noise ratio of portions of said normalized data that approximate said test signature data wherein first filtered data is generated;

providing a threshold level;

digitizing said first filtered data using said threshold level to generate first digitized data, wherein pieces of said first filtered data that have values greater than or equal to said threshold level are converted to a logic level "1" and pieces of said first filtered data that have values less than said threshold level are converted to a logic level "0";

convolving said first digitized data with a unity weighting function window to generate density data wherein a density data value is assigned to each piece of said first digitized data, said unity weighting function window being indexed to approximate an image of said type of target;

providing a first conditional probability for each said density data value of said density data if said type of target is present, a second conditional probability for each said density data value of said density data if said type of target is not present, and a probability threshold value p where p is a real number greater than 0;

digitizing said density data using said first conditional probability, said second conditional probability and said probability threshold value to generate second digitized data, wherein said density data values whose said first conditional probability is at least p times more likely than said second conditional probability are converted to a logic level "1", and wherein said density data values whose said first conditional probability is less than p times more likely than said second conditional probability are converted to a logic level "0"; and forming a display image of said area of concern using said second digitized data wherein portions of said display image represented by clusters of pixels having a logic level "1" have a high probability of representing a target that is like said type of target.

3. A method of detecting a mine-like target comprising the steps of:

providing at least one sensor that generates sonar data from an area of concern under the surface of the water;

generating image data from said sensor data, said image data characterized by a first plurality of pixels that are indexed to represent an image of said area of concern, each of said first plurality of pixels defined by an intensity level;

providing a test signature representative of idealized sonar data for a pre-target region, a highlight region, a dead-zone region and a shadow region associated with a portion of said mine-like target, said test signature characterized by a second plurality of pixels that are indexed to represent an image of said pre-target region, said highlight region, said dead-zone region and said shadow region, each of said second plurality of pixels defined by a known intensity level;

normalizing said image data to generate normalized data;

filtering said normalized data using said test signature to increase the signal-to-noise ratio of portions of said normalized data that approximate said test signature wherein first filtered data is generated;

providing a selection minimum value J;

digitizing said first filtered data to generate first digitized data, wherein a portion of pixels characterizing said first filtered data that have the greatest intensity levels are converted to a logic level "1" and a remainder of pixels characterizing said first filtered data are converted to a logic level "0", wherein said portion is the minimum of J and the number of pixels characterizing said first filtered data having a positive intensity level;

convolving said first digitized data with a data window to generate density data wherein a density data value is assigned to each pixel characterizing said first digitized data, said data window characterizing a third plurality of pixels that are indexed to represent a rectangular arrangement of pixels that is sized approximately equal to an image of said mine-like target, each of said third plurality of pixels defined by a unity weighting function;

providing a first conditional probability for each said density data value of said density data if said mine-like target is present, a second conditional probability for each said density data value of said density data if said mine-like target is not present, and a probability threshold value p where p is a real number greater than 0;

digitizing said density data using said first conditional probability, said second conditional probability and said probability threshold value to generate second digitized data, wherein said density data values whose said first conditional probability is at least p times more likely than said second conditional probability are converted to a logic level "1", and wherein said density data values whose said first conditional probability is less than p times more likely than said second conditional probability are converted to a logic level "0"; and forming a display image of said area of concern using said second digitized data wherein portions of said display image represented by clusters of pixels having a logic level "1" have a high probability of representing a target that is like said mine-like target.

* * * * *